United States Patent [19]

Hara et al.

[11] Patent Number: 5,720,690
[45] Date of Patent: Feb. 24, 1998

[54] SHIFT CONTROL SYSTEM FOR CONTROLLING A TRANSMISSION OF A VEHICLE HAVING AN ENGINE AND A MOTOR GENERATOR DRIVE SOURCE

[75] Inventors: Takeshi Hara, Chiryu; Shigeo Tsuzuki, Takahama; Satoru Tanaka, Nishio; Manabu Watanabe, Toyota; Kenji Omote, Nishio, all of Japan

[73] Assignee: Aisin AW Co., Ltd., Anjo, Japan

[21] Appl. No.: 662,259

[22] Filed: Jun. 14, 1996

[30] Foreign Application Priority Data

Jun. 16, 1995 [JP] Japan ................... 7-150375
Jun. 16, 1995 [JP] Japan ................... 7-150376

[51] Int. Cl.[6] ........................... B60K 6/04
[52] U.S. Cl. ............... 477/20; 477/3; 477/16; 180/65.2
[58] Field of Search ............... 477/15, 16, 2, 477/3, 20; 180/165, 65.2, 65.3, 65.4, 65.6, 65.7, 65.8; 475/5

[56] References Cited

U.S. PATENT DOCUMENTS

| | | | |
|---|---|---|---|
| 4,680,986 | 7/1987 | Elsner | 180/165 |
| 4,883,973 | 11/1989 | Lakey et al. | 290/31 |
| 5,285,111 | 2/1994 | Sherman | 475/5 |
| 5,287,772 | 2/1994 | Aoki et al. | 477/20 |

*Primary Examiner*—Charles A. Marmor
*Assistant Examiner*—Sherry Lynn Estremsky
*Attorney, Agent, or Firm*—Oliff & Berridge PLC

[57] ABSTRACT

A control system for a vehicular drive unit including an engine; a transmission connected to the output shaft of the engine and having a plurality of gear stages for transmitting the power to wheels; a motor generator connected to the output shaft of the engine for recovering the braking energy of the wheels through the transmission by generating electricity; a battery for storing the braking energy, which is recovered by the motor generator, as an electric power; a running status detector for detecting the running status of the vehicle; and controller for controlling the transmission and the motor generator in accordance with the output signal coming from the running status detector. The control means includes a motor generator controller for causing the motor generator to generate the electricity, when the running status detecting means detects a deceleration state of the vehicle, thereby to recover the braking energy; and a shift controller for shifting the transmission to such a gear stage between the present gear stage and a gear stage having a gear ratio higher than that of the present gear stage as maximizes the recoverable braking energy.

15 Claims, 10 Drawing Sheets

SHIFT CONTROL SYSTEM FOR CONTROLLING A TRANSMISSION OF A VEHICLE HAVING AN ENGINE AND A MOTOR GENERATOR DRIVE SOURCE

BACKGROUND OF THE INVENTION

1. Field of the Invention

The invention relates to a control system for a vehicular drive unit. Specifically, the invention relates to a shift control of a transmission at the braking time of a vehicle that is equipped with an engine and a motor generator as its drive source. More specifically, the invention relates to a shift control of a transmission at the time of changing the vehicle from a braked status to a driven status.

2. Description of Related Art

In the related art, there is an electric car which employs a motor as its drive source and which charges the battery at a braking time with the braking energy coming from wheels as an electric power by causing the motor to generate electricity, as disclosed in U.S. Pat. No. 5,287,772.

Generally speaking, the energy to be recovered by the motor is determined by the characteristics (e.g., the RPM and the braking torque) of the motor. In the electric car, therefore, the braking energy from the wheels is recovered to the maximum by shifting the transmission which is connected to the output shaft of the motor.

In the electric car, however, the gear stage for maximizing the energy to be recovered is determined by computing the energies to be recovered from the present gear stage and the gear stages higher and lower by one rank than the present one, and changing to the gear stage which can maximize the recoverable energy of the three gear stages.

At the time of a high braking energy, e.g., at an abrupt braking time, therefore, if it is assumed that the present gear stage is the 4th speed, there occurs a busy shift, in which the speeds are changed one by one from the 4th speed to the 3rd, 2nd and 1st speeds, although the 1st speed is best for recovering the maximum energy. During this shifting, moreover, the energy cannot be recovered so that the energy recovery is less for an increased number of gear changes.

In this electric car, moreover, the energy is computed at a gear stage higher by one rank so that the up-shift occurs to mismatch the intention of the driver, although he depresses the brake, thereby to make the behavior of the vehicle unstable.

Moreover, the RPM of the motor is enlarged because the shift is made to the gear stage maximizing the energy. Especially in the drive unit of hybrid type in which the drive source includes an engine in addition to the motor, the engine is held in the idling status to reduce the fuel consumption rate while the energy is being recovered. When the vehicle is to be accelerated again from its decelerated status, it is necessary to run the engine to synchronize the RPM of the engine and the RPM of the motor. However, if the engine is raised to the RPM of the motor, its fuel consumption rate is so increased that the mileage cannot be improved.

SUMMARY OF THE INVENTION

It is, therefore, an object of the invention to provide a control system for a vehicle having an engine and a motor generator as its drive source, that can make a shift to a gear stage for maximizing the braking energy coming from the wheels while stabilizing the behavior at the deceleration time of the vehicle.

Another object of the invention is to provide a control system which can accelerate again the vehicle smoothly from the deceleration while minimizing the fuel consumption.

In order to achieve the above-specified objects, according to one aspect of the invention, there is provided a control system for a vehicular drive unit, comprising an engine; a transmission connected to the output shaft of the engine and having a plurality of gear stages for transmitting the power to the wheels; a motor generator connected to the output shaft of the engine for recovering the braking energy of the wheels through the transmission by generating electricity; a battery for storing the braking energy, which is recovered by the motor generator, as electric power; running status detecting means for detecting the running status of the vehicle; and control means for controlling the transmission and the motor generator in accordance with the output signal coming from the running status detecting means.

The control means includes motor generator control means for causing the motor generator to generate electricity, when the running status detecting means detects a deceleration state of the vehicle, thereby to recover the braking energy; and shift control means for shifting the transmission to such a gear stage between the present gear stage and a gear stage having a gear ratio higher than that of the present gear stage that maximizes the recoverable braking energy.

According to another aspect of the invention, there is provided a control system for a vehicular drive unit, comprising an engine; a transmission connected to the output shaft of the engine and having a plurality of gear stages for transmitting the power to wheels; a motor generator connected to the output shaft of the engine for recovering the braking energy of the wheels through the transmission by generating electricity; a battery for storing the braking energy, which is recovered by the motor generator, as electric power; running status detecting means for detecting the running status of the vehicle; and control means for controlling the transmission and the motor generator in accordance with the output signal coming from the running status detecting means. The control means includes motor generator control means for causing the motor generator to generate the electricity, when the running status detecting means detects a deceleration state of the vehicle, thereby to recover the braking energy; and shift control means for shifting the transmission to such a gear stage, when it is detected by the running status detecting means that any deceleration of the vehicle is unnecessary, that the RPM of the motor generator is less than but closest to a predetermined value.

According to the invention as set forth above, when the vehicle is detected to be in the deceleration state, the motor generator is caused to generate the electricity thereby to recover the braking energy, and the transmission is shifted to such a gear stage between the present gear stage and the gear stage having a higher gear ratio than that of the present one as can maximize the amount of the recoverable energy, so that the energy can be efficiently recovered.

Moreover, since the shift is effected by making a comparison with the gear stage having a higher gear ratio than the present gear stage, the jump shift (or skip shift) from the 4th to 2nd speeds or from the 4th to 1st speeds, for example, can be performed to reduce the number of shifts thereby to improve the recovery efficiency of the energy.

Still moreover, since the shift is effected only in the down-shift mode, it can match the intention of the driver, and the behavior of the vehicle can be stabilized.

In addition, the amounts of energy to be recovered at the individual gear stages are determined by the energy computing means, and the shift selecting means selects the gear stage maximizing the recoverable braking energy from the computed results, so that the shift can be reliably made to the gear stage of high recovery efficiency. Further, the recoverable braking energy can be accurately determined by computing the product.

According to the invention, the shift is effected only when the vehicle speed is below the predetermined value, so that the motor generator may be prevented from over-revolution by the down-shift when the vehicle speed is over the predetermined value.

Additionally, the shift is effected on the basis of a braking shift map, which is preset to maximize the energy in relation to the vehicle speed and the braking torque, thereby simplifying control.

Further, according to the invention, because the abrupt braking is performed within a high braking torque, i.e., with a large depression of the brake, the jump shift (or skip shift) can be effected with less boundary lines, to avoid the busy shift.

Accordingly, the abrupt brake is decided when the depression of the brake or its change is large, the shift is effected only for the small brake depression or change so that the behavior of the vehicle may be prevented from becoming unstable by the shift.

According to the invention, the shift is effected only when there is no steering operation so that the behavior of the vehicle may be prevented from becoming unstable by the shift during the steering operation. Thus, according to the invention, the braking energy from the wheels is recovered only when the transmission is not shifted, because it highly fluctuates during the shifting.

According to the invention, the braking energy can be recovered by causing the motor generator to generate electricity when the vehicle is detected to be in the deceleration status. When no deceleration of the vehicle is required, that is, when the vehicle may be accelerated again, the shift control means makes the shift to the gear stage at which the RPM of the motor generator is less than but closest to a predetermined value, so that the engine and the motor generator are easily synchronized in their RPMs. Moreover, when the RPM of the engine is synchronized with that of the motor generator, the fuel consumption for raising the RPM of the engine can be suppressed to improve the mileage. Here, the predetermined value is set to an RPM which is larger than the idling RPM.

According to the invention, the RPMs of the motor generator at the individual gear stages are determined by the RPM computing means, and the gear stage selecting means selects the gear stage, at which the RPM of the motor generator is less than but closest to the predetermined value, from the computation results. As a result, the RPM of the motor generator can be reliably reduced.

According to the invention, when there is no gear stage having an RPM less than the predetermined value, the RPM of the motor generator can be minimized by shifting the transmission to the highest gear stage for the minimum gear ratio.

Further, according to the invention, the shift is effected on the basis of the braking shift map, which is preset in relation to the vehicle speed and the braking torque, so that the control is simplified.

According to the invention, the shift point within a range for a low braking torque is made identical to that for the down-shift at the driving time so that the unnecessary shift at the changing time from the braking shift map to the driving shift map can be eliminated when the vehicle is to be accelerated from the deceleration state.

According to the invention, at the time of the deceleration state, the vehicle is decelerated by depressing the brake. When the change in the depression of the brake is negative, that is, when the brake is released from its depressed state, the deceleration of the vehicle is detected as unnecessary so that the possibility of the re-acceleration of the vehicle can be promptly detected.

BRIEF DESCRIPTION OF THE DRAWINGS

The invention will be described with reference to the drawings in which.

DESCRIPTION OF THE PREFERRED EMBODIMENT

Figure 1:
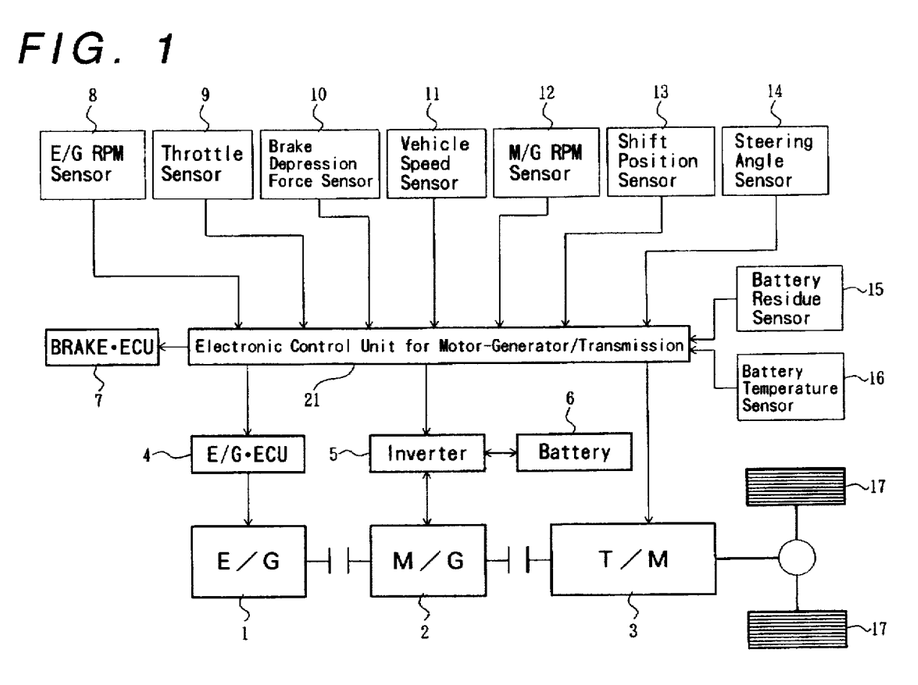
FIG. 1 is a diagram showing the structure of a vehicular drive unit according to the embodiment of the invention.

FIG. 1 is a block diagram showing the structure of a vehicular drive unit according to the embodiment of the invention.

In the Figure reference numeral 1 designates an engine (E/G); numeral 2 a motor generator (M/G) connected to the output shaft of the engine 1; numeral 3 a transmission (T/M) connected to the motor generator 2; numeral 4 an engine electronic control unit (E/G ECU); numeral 5 an inverter connected with the motor generator; numeral 6 a battery connected with the inverter 5; numeral 7 a brake electronic control unit (BRAKEECU); numeral 8 an engine RPM sensor; numeral 9 a throttle sensor; numeral 10 a brake depression force sensor; numeral 11 a vehicle speed sensor; numeral 12 a motor generator RPM sensor; numeral 13 a shift position sensor; numeral 14 a steering angle sensor; numeral 15 a battery residue sensor; numeral 16 a battery temperature sensor; numeral 17 vehicle wheels; and numeral 21 a motor-generator/transmission electronic control unit for governing/controlling the entirety.

Thus, the vehicular drive unit of the invention is structured to comprise the engine 1; the transmission 3 connected to the output shaft of the engine 1 and having a plurality of gear stages for transmitting the power to the wheels 17; the motor generator 2 connected to the output shaft of the engine 1 for recovering the braking energy of the wheels 17 through the transmission 3 by generating electricity; the battery 6 for storing the braking energy, recovered by the motor generator 2, as the electric power; the brake depression force sensor 10 for detecting the deceleration of the vehicle; and the motorgenerator/transmission electric control unit 21 acting as control means for controlling the transmission 3 and the motor generator 2 in response to the output signal of the brake depression force sensor 10.

A specific control of the vehicular drive unit will now be described.

Figure 2:
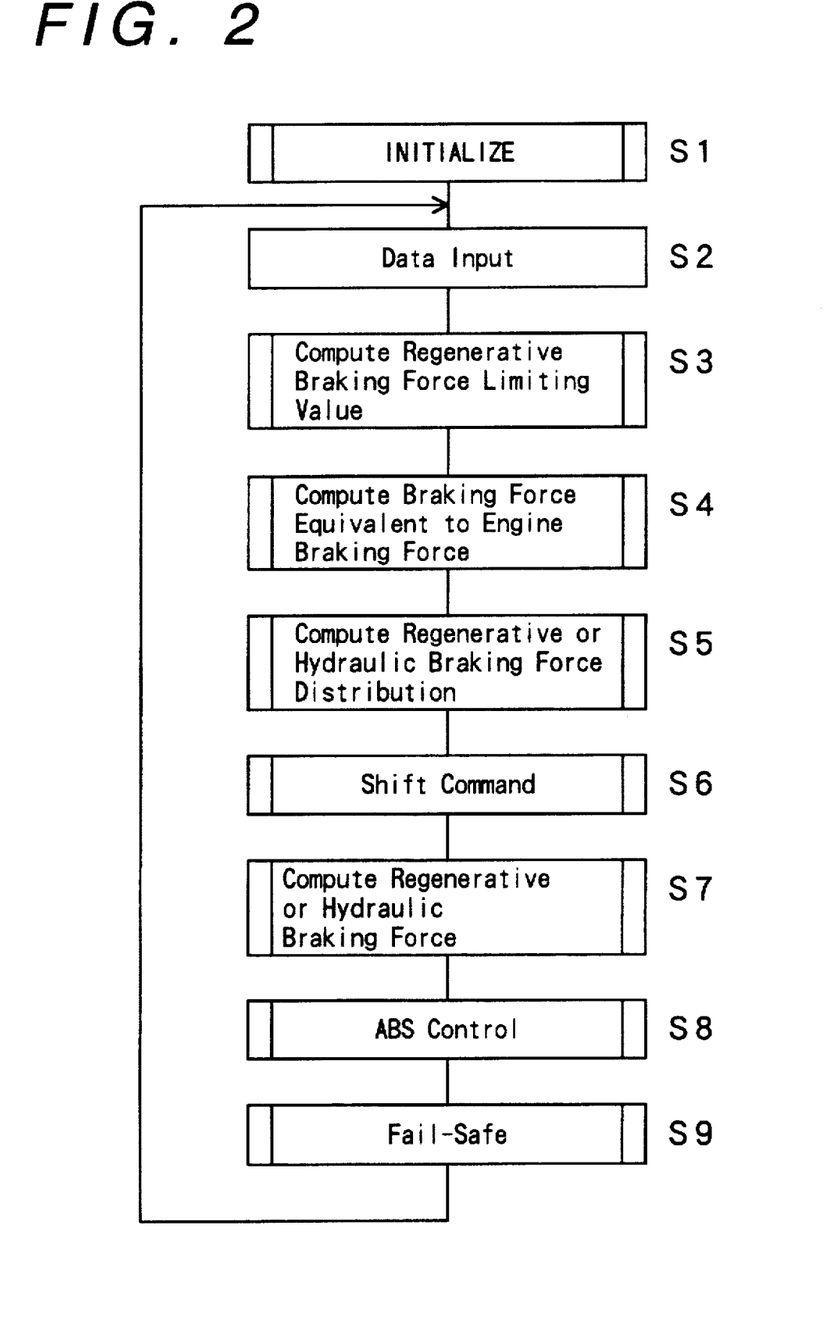
FIG. 2 is a flow chart showing the main control of the vehicular drive unit according to the embodiment of the invention.

As shown in the flow chart of FIG. 2, first, the brake electronic control unit (BRAKEECU) 7 and the motorgenerator/transmission electronic control unit 21 are initialized into their operable statuses at Step S1.

The data are input at Step S2. The input data are exemplified by the battery residue obtained from the battery residue sensor 15; the battery temperature obtained from the battery temperature sensor 16; the RPM of the motor generator obtained from the motor generator RPM sensor 12; the brake depression force obtained from the brake depression force sensor 10; the degree of opening of the accelerator obtained from the throttle sensor 9; the steering angle obtained from the steering angle sensor 14; the shift position obtained from the shift position sensor 13; and the engine RPM obtained from the engine RPM sensor 8. These data are read in the motor-generator/transmission electronic control unit 21.

Next, the limit value of the regenerative braking force, as exhibited at each instant, is computed at Step S3 on the basis of the output values coming from the various sensors.

At step S4, the engine brake equivalent regenerative braking force is computed. When the depression force of the accelerator pedal is weakened, the regenerative torque is computed from the gear ratio of the prevailing gear stage, so that the engine brake equivalent regenerative braking force is computed from the regenerative torque and the vehicle speed obtained from the vehicle speed sensor 11.

The distribution between the regenerative braking force and the hydraulic braking force is then computed at step S5, that is, the distribution between the regenerative braking force of the motor generator 2 and the hydraulic braking force of the brake oil pressure is computed.

At step S6, a gear stage for maximizing the regenerative energy is determined to effect the shift automatically. This detail will be described.

A control is then made, at Step S7, to distribute the regenerative braking force and the hydraulic braking force at a predetermined ratio.

At step S8, an anti-lock brake control is effected to prevent any excessive slip of the wheels. When it is detected by the vehicle speed sensor 11 that the wheels come into the locked states, the brake oil pressure is reduced by the brake ECU 7 to prevent the wheels from being locked and when the present control system is troubled, the fail-safe control is executed at Step S9.

The shift command flow according to the embodiment of the invention, that is, of Step S6, will be described with reference to FIG. 3.

First, it is decided at Step S11, based on a change in the input RPM (or engine RPM) of the T/M 3, whether the T/M 3 is shifting. If the result is NO, it is checked at Step S12, on the basis of the information from the steering angle sensor 14, whether the vehicle is being steered.

If the result is NO, a regenerative energy E, corresponding to the gear ratio of the gear stage (1 to 4), is computed at Step S13. The routine of this regenerative energy will be described later in more detail.

Next, it is checked whether the braking is abrupt, at Step S14, by examining whether the depression of the brake is greater than a threshold value. The expression $F_{BSf}$ indicates the threshold value of the brake depression.

If the result is NO, the change in the brake depression is checked at Step S15. If, on the basis of the information from the brake depression force sensor 10 that the brake depression, or its change, is high at Steps S14 or S15, it is determined that the braking is abrupt.

If the answer at Step S15 is NO, a shift change command using Pattern 1 is executed at Step S16. This shift change command for Pattern 1 will be described in more detail later.

Next, it is checked whether the brake is released at Step S17 by examining whether the change in the brake depression is positive or negative. If this results in a determination that the brake is released, a shift change command using Pattern 2 is executed at Step S18. The shift change command for Pattern 2 will be described in more detail later.

If the answer back in Step S11 was YES, that is, if the vehicle is being shifted, the regenerative braking is inhibited at Step S19.

If, moreover, any of the answers of Steps S12, S14 and S15 were YES, the transmission is not shifted, but the regeneration is effected at the prevailing gear stage.

Next, the aforementioned computation flow of the regenerative energy of Step S13 will be described with reference to FIG. 4.

First, a=4 is set at Step S31 so as to determine the regenerative energy of the 4th speed.

Next, a M/G torque $T_{MT(a)}$ is determined at Step S32. Here, $T_{MT(a)}=T_{RG}/R_{(a)}$, where $T_{RG}$ designates a braking torque and $R_{(a)}$ designates a gear ratio of the gear stage a.

At Step S3, it is checked whether the M/G torque $T_{MT(a)}$ is over a limit $T_{LM}$ of the torque to be regenerated by the M/G. If the result is YES, the M/G torque $T_{MT(a)}$ is set, at Step S34, to the torque limit $T_{LM}$ which can be regenerated by the M/G. If the answer at Step S33 is NO, an M/G RPM $N_{M(a)}$ is determined at Step S35. Here, $N_{M(a)}=N_{M(n)} \times R_{(a)}/R_{(n)}$, where $N_{M(n)}$ designates the M/G RPM at the present gear stage n, and $R_{(n)}$ designates the gear ratio at the present gear stage n.

Next, at Step S36, it is checked whether the M/G RPM $N_{M(a)}$ is greater than the maximum $N_{Mmax}$ of the M/G RPM. If the result is NO, an efficiency $\eta_{(a)}$ is determined at Step S37 from the M/G torque $T_{MT(a)}$ and the M/G RPM $N_{M(a)}$ and a regenerative energy $E_{(a)}$ is determined at Step S38. Here, $E_{(a)}$=the efficiency $\eta_{(a)} \times$ M/G torque $T_{MT(a)} \times$ M/G RPM $N_{M(a)}$. If the answer at Step S36 is YES, the $E_{(a)}$ is set to 0, at Step S39, because the regenerative energy $E_{(a)}$ cannot be recovered. This processing is repeated, through Steps S40 and S41, until the 1st speed (a=1) is restored.

Then, the routine is returned to the main process when the computation of the regenerative energy $E_{(a)}$ is performed at the final gear ratio (a=1).

Next, the flow of the aforementioned shift change command for Pattern 1 of Step S16 will be described with reference to FIG. 5.

First, it is checked at Step S61 whether the vehicle speed $V_{(n)}$ is less than or equal to a threshold value. If the result is NO, the routine is returned with no shift so as to prevent the motor from being over-revolved by the downshift. However, if the answer is YES, it is checked at Step S62 whether the gear stage is the present one (n=4).

If the answer of Step S62 is YES, the regenerative energies $E_{(a)}$ (a=1, 2, 3 and 4) at the 1st to 4th speeds, as determined at Step S38, are compared at Step S63. If the answer of Step S62 is NO, it is checked at Step S64 whether the gear stage is the next one (n=3).

If the result at Step S64 is YES, the regenerative energies $E_{(a)}$ (a=1, 2 and 3) at the 1st to 3rd speeds, as determined at Step S38, are compared at Step S65. If the answer of Step S64 is NO, it is checked at Step S66 whether the gear stage is the next one (n=2).

If the result of Step S66 is NO, the present gear stage is the 1st speed and is retained because no more downshift cannot be effected. If YES, the regenerative energies $E_{(a)}$ (a=1 and 2) at the 1st and 2nd speeds, as determined at Step S38, are compared at Step S67.

Following one of steps S63, S65 and S67, the maximum of the regenerative energy is selected at Step S68 from the result of the comparisons at Steps S63, S65 and S67.

The gear stage is then set, at Step S69, to that at which the regenerative energy $E_{(a)}$ is the maximum and the shift change command is executed at Step S70.

From the description thus far made, the motorgenerator/ transmission electronic control unit 21 causes, when it detects a deceleration of the vehicle, the motor generator 2 to generate the electricity by recovering the braking energy, and the transmission 3 to shift to such an optimum gear stage between the present gear stage and a gear stage having a higher gear ratio than that of the present one as to recover the maximum braking energy.

Thus, when it is detected that the vehicle is being decelerated, the braking energy is recovered through the inverter 5 by the battery 6 by causing the motor generator 2 to generate the electricity, and the transmission 3 is shifted to such a gear stage between the present gear stage and the gear stage of the highest gear ratio than that of the present gear stage as can recover the maximum energy. As a result, the energy can be recovered more efficiently.

On the other hand, since the shift is performed by comparing the gear stage having a higher gear ratio than that of the present gear stage, a jump shift (or skip shift) from the 4th to 2nd speeds or from the 4th to 1st speeds can be effected to reduce the shift number thereby to improve the recovery efficiency of the energy.

Moreover, since what is effected is the downshift, the shift can satisfy the intention of the driver, and the behavior of the vehicle can be stabilized.

Figure 5:
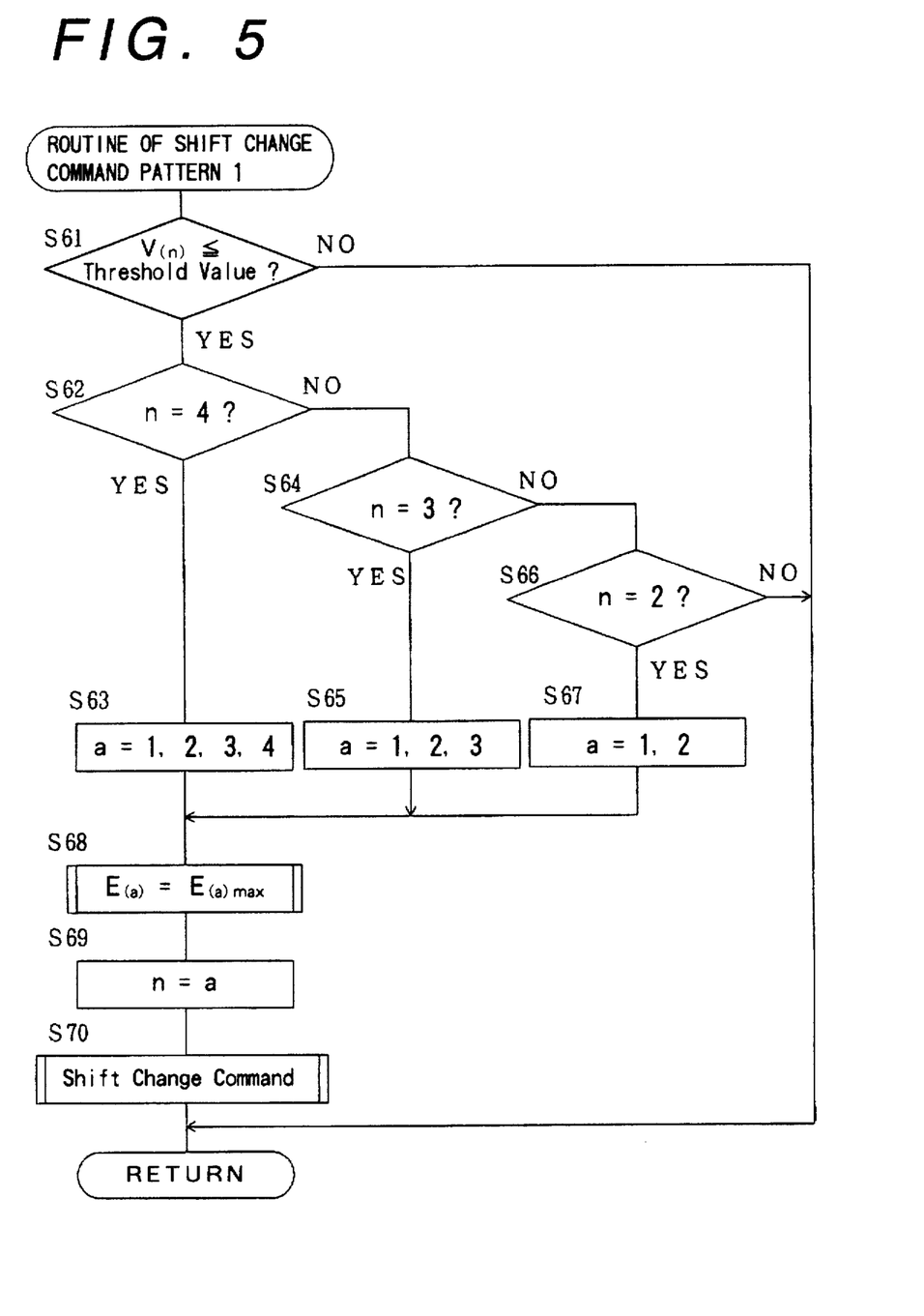
FIG. 5 is a flow chart of a shift change command, for Pattern 1, according to the embodiment of the invention.

As shown in FIG. 5, the shift control is executed by computing the recoverable braking energies of the individual gear stages, by comparing the computed energies and by selecting such an optimum gear stage (n=a) between the present gear stage and the gear stage having a higher gear ratio than that of the present one as can maximize the recoverable braking energy. The shift command is issued to effect the shift to the optimum gear stage, as decided by the selection.

Thus, the energies to be recovered at the individual gear stages are computed so that the energies to be recovered by the gear stage selecting means are determined by the computation means. As a result, the gear stage for maximizing the recoverable energy is selected so that the transmission can be shifted without fail to the gear stage providing excellent recovery efficiency.

Figure 4:
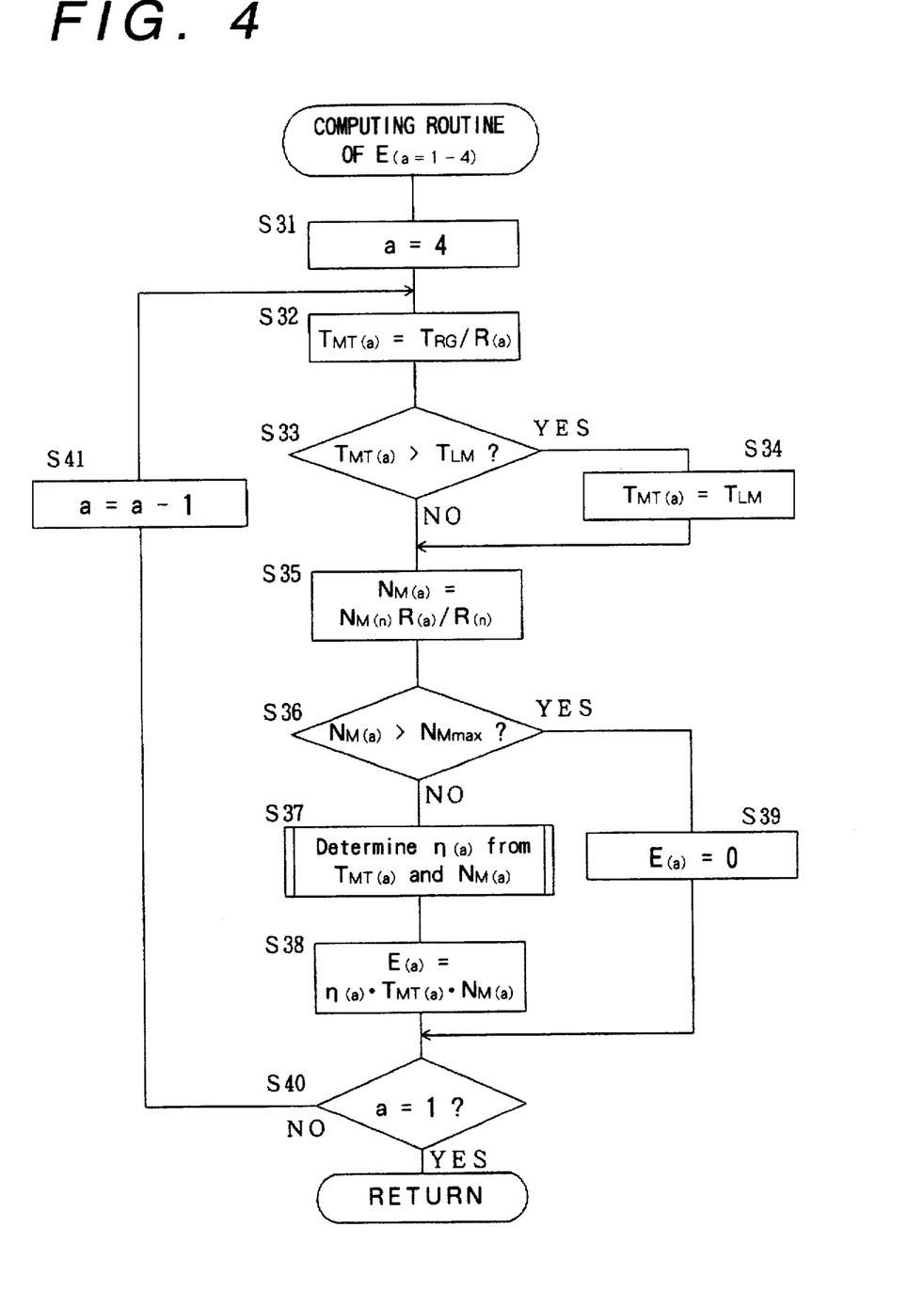
FIG. 4 is a flow chart for computing the regenerative energy according to the embodiment of the invention.

As shown in FIG. 4, there are provided the brake depression force sensor 10 for detecting the depression force of the brake and the motor generator RPM sensor 12 for detecting the RPM of the motor generator 2. The computation means computes the recoverable braking energy from the product of the braking torque $T_{MT(a)}$ by the output signal of the brake depression force sensor 10, the RPM $N_{M(a)}$ of the motor generator 2 by the output signal of the motor generator RPM sensor 12, and the efficiency $\eta_{(a)}$ of the motor generator 2. Thus, the recoverable braking energy can be accurately determined by the computation of $T_{MT(a)} \times N_{M(a)} \times \eta_{(a)}$.

As shown in FIG. 5, there is provided the vehicle speed sensor 11 for detecting the vehicle speed. When the vehicle speed $V_{(n)}$, indicated by the output signal of the vehicle speed sensor 11, is below a predetermined value, the shift command means shifts the transmission 3 to the optimum gear stage. Thus, the shift command means effects the shift in response to the output signal of the vehicle speed sensor 11 only when the vehicle speed $V_{(n)}$ is below the predetermined value. As a result, it is possible to effectively prevent the over-revolution of the motor generator 2, as might otherwise be caused by the downshift when the vehicle speed $V_{(n)}$ is over the predetermined value.

Figure 3:
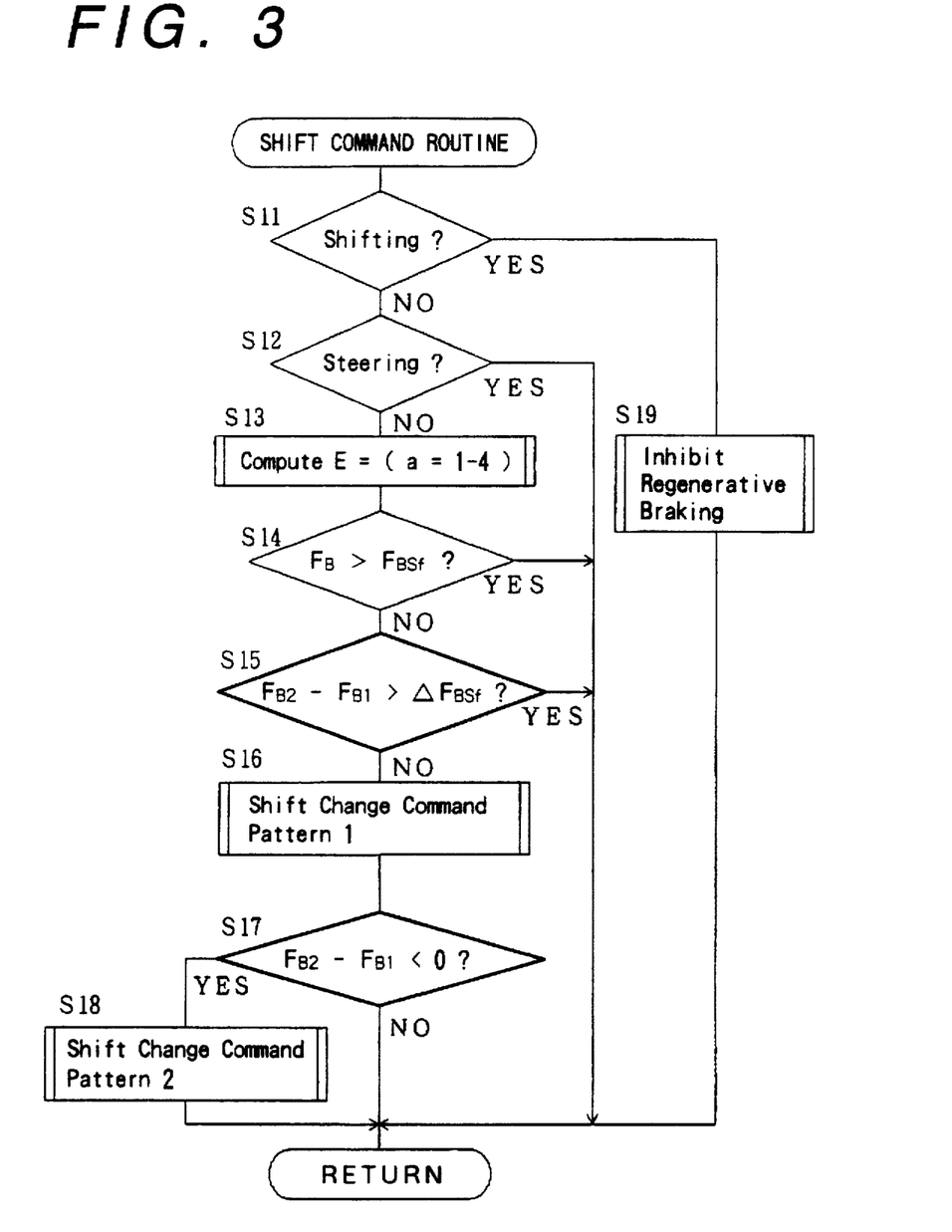
FIG. 3 is a shift command flow chart according to the embodiment of the invention.

As shown in FIG. 3, there is provided the brake depression force sensor 10 for detecting the depression force of the brake. When the brake depression force, indicated by the output signal of the brake depression force sensor 10, is below a predetermined value and when the change in the brake depression force is below a predetermined value, the transmission 3 is shifted to the optimum gear stage.

Thus, when the brake depression or its change is high, the braking is decided to be abrupt so that the vehicular behavior is prevented from becoming unstable due to a shift. As a result, the shift can be effected only when the brake depression or its change is low.

Also, as shown in FIG. 3, there is provided the steering angle sensor 14 for detecting the steering angle. The shift control means shifts the transmission 3 to the optimum gear stage when it is decided from the output signal of the steering angle sensor 14 that the vehicle is not being steered. Thus, the shift is effected only when the vehicle is not steered, so that the vehicular behavior does not become unstable as a result of a shift during a steering operation.

Further, as also shown in FIG. 3, the motor generator 2 is caused, when the transmission 3 is not shifted, to generate the electricity thereby to recover the braking energy from the wheels 17. Thus, because the braking energy from the wheels 17 highly fluctuates during the shift, it is recovered only when the transmission is not shifted.

Figure 6:
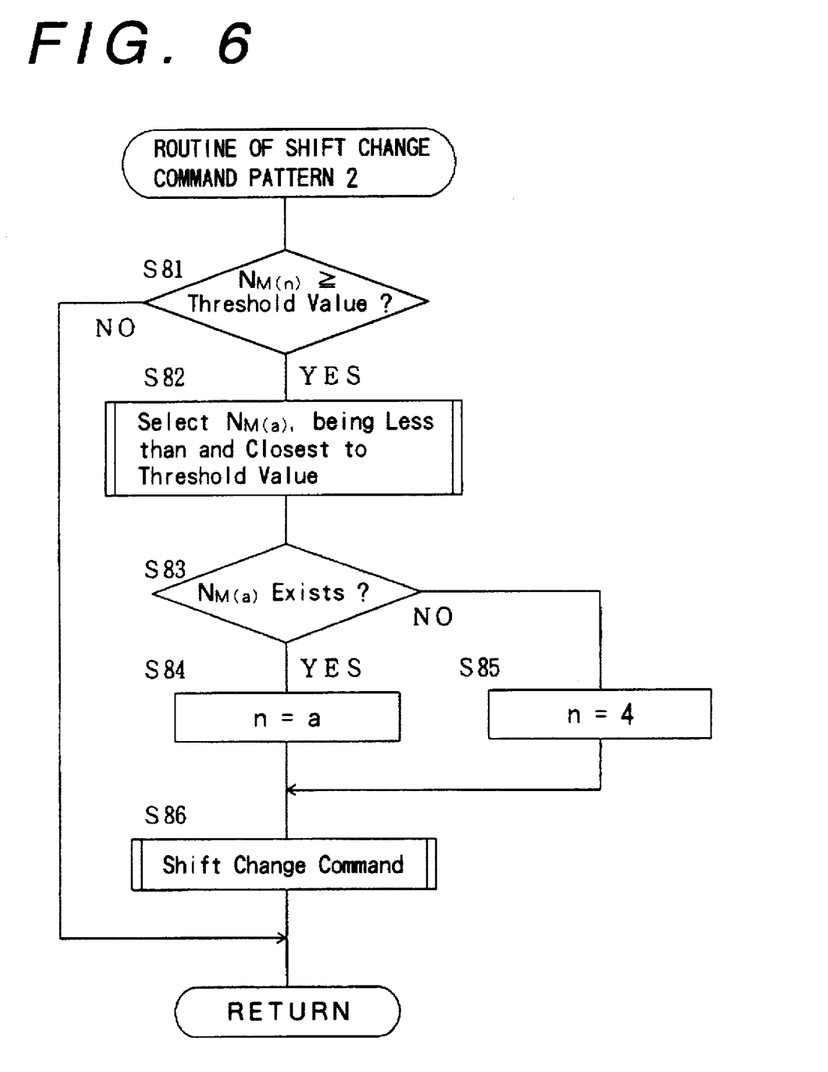
FIG. 6 is a flow chart of a shift change command, for Pattern 2, of the embodiment of the invention.

Next, the flow of the aforementioned shift change command using Pattern 2, of Step S18 of FIG. 3, will be described with reference to FIG. 6.

First, it is checked at Step S81 whether the M/G RPM $N_{M(n)}$ is over a threshold value. Here, the threshold value is set to a value slightly larger than the idling RPM. If the result is NO, no shift is effected and the present gear stage is held.

If the answer at Step S81 is YES, such one of the M/G RPM $N_{M(a)}$, determined at Step S35, that is lower than but closest to the threshold value, is selected at Step S82.

It is then checked at Step S83 whether there is the M/G RPM $N_{M(a)}$. If the answer at Step S83 is YES, the gear stage n is set, at Step S84, to the gear stage a, as selected at Step S82. If the answer of Step S83 is NO, the gear stage is set at Step S85 to the highest gear stage n=4 so as to minimize the M/G RPM.

Next, the shift is set to the gear stage which is set at Steps S84 and S85, and the shift change command is issued at Step S86. After this, the routine is returned to the main program. The return to the main program is also performed if the answer of Step S81 is NO.

From the description thus far made, the motorgenerator/ transmission electronic control unit 21 is equipped with the motor generator control means for causing the motor generator 2, when the deceleration state of the vehicle is detected, to generate the electricity thereby to recover the braking energy, and shifts the transmission 3, when the running status detecting means detects that the deceleration of the vehicle is unnecessary, to the optimum gear stage at which the RPM of the motor generator 2 is less than and closest to the predetermined value.

Thus, when the vehicle is detected to be in the deceleration state, the braking energy can be recovered through the inverter 5 in the battery 6 by causing the motor generator 2 to generate the electricity. When no deceleration of the vehicle is required, that is, when the vehicle may be accelerated again, on the other hand, the shift control means shifts the transmission to the optimum gear stage, at which the RPM of the motor generator 2 is less than and closest to the predetermined value, so that the RPM of the engine 1 and the RPM of the motor generator 2 can be easily synchronized.

At the time of synchronizing the RPMs of the engine 1 and the motor generator 2, the fuel consumption for raising the RPM of the engine 1 can be suppressed to improve the mileage. Here, the predetermined value is set to an RPM larger than the idling RPM.

As shown in FIG. 5, the RPMs of the motor generator 2 are computed at the individual gear stages, and the optimum gear stage, at which the RPM of the motor generator 2 is less than and closest to the predetermined value, is selected from the computation results, so that the transmission 3 is shifted to the optimum gear stage, as selected by the gear stage selection.

Thus, the RPMs of the motor generator 2 at the individual gear stages are determined by the computation means, and the optimum gear stage, at which the RPM of the motor generator 2 is less than and closest to the predetermined value, is selected from the computation results so that the RPM of the motor generator 2 can be reliably reduced.

Further, as shown in FIG. 5, if there is no gear stage at which the RPMs of the motor generator 2 obtained by the computation means are not less than the predetermined value, the highest gear stage (N=4) is selected from the plurality of gear stages.

Thus, when there is no gear stage having an RPM less than the predetermined value, the transmission is shifted to the highest gear stage having the lowest gear ratio, so that the RPM of the motor generator 2 can be minimized.

There is provided the brake depression force sensor 10 for detecting the depression force of the brake, so that the running status detecting means detects that the deceleration of the vehicle is unnecessary, in response to the output signal of the brake depression force sensor 10, when the change in the brake depression force is negative, as shown in FIG. 3. Thus, in the deceleration state, the vehicle is decelerated by depressing the brake. As a result, when the change in the depression of the brake is negative, that is, when the brake is released, it is detected that the deceleration of the vehicle is unnecessary, so that the possibility of the re-acceleration of the vehicle can be promptly detected. During the shift, the braking energy from the wheels 17 fluctuates highly. Hence, the braking energy is recovered only when the vehicle is not shifted.

On the contrary, the shift control can also be executed by a shift diagram, or map, for the regeneration. This will be described in detail in the following.

In this case, if the braking torque, as exemplified by brake depression force from the brake depression force sensor and the vehicle speed is input, the control is changed to the shift diagram for the regeneration no matter what state the accelerator opening, indicated by the throttle sensor, might be held in.

Figure 9:
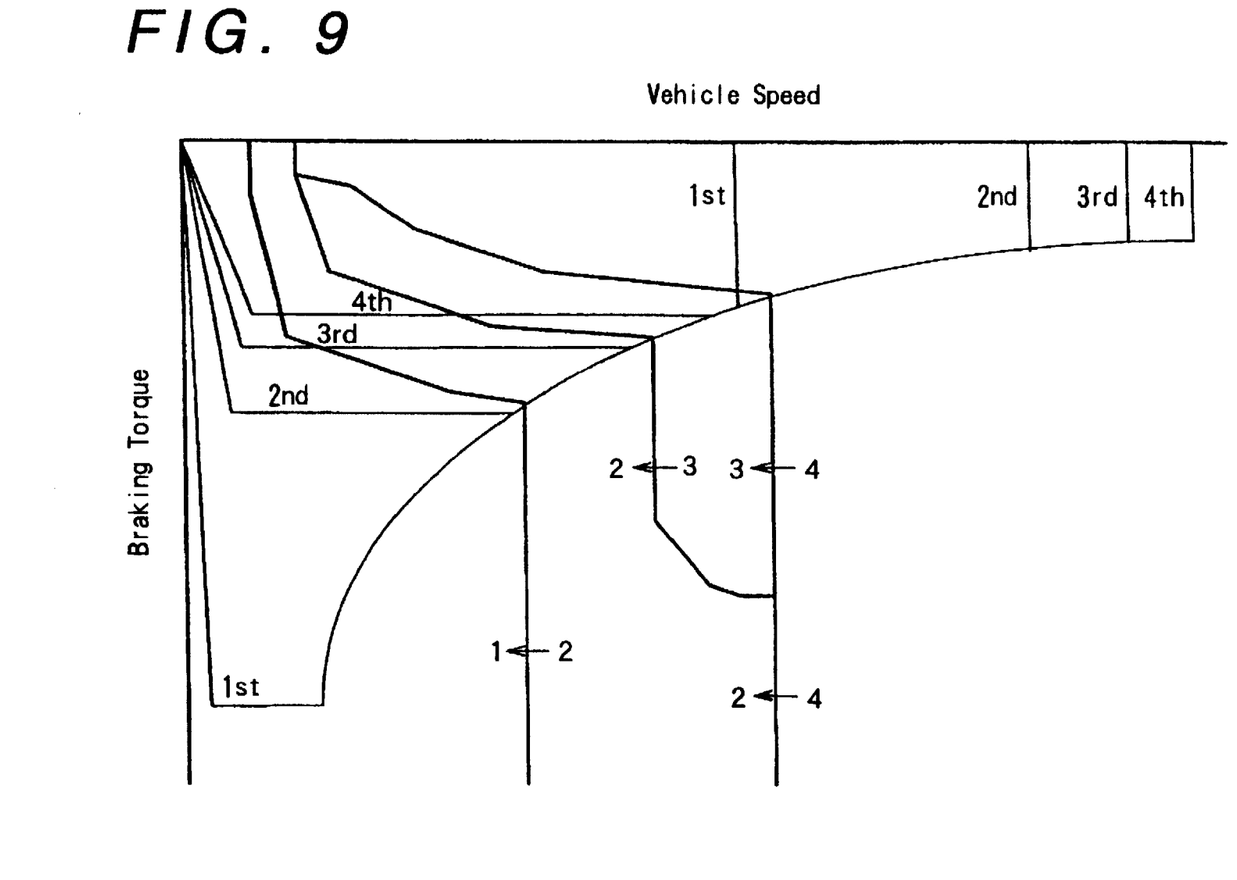
FIG. 9 is a diagram showing a regenerative braking shift map according to the embodiment of the invention.

In other words, the regenerative braking is effected by using the shift map for the regeneration, i.e., the regenerative braking shift map, as shown in FIG. 9.

Figure 7:
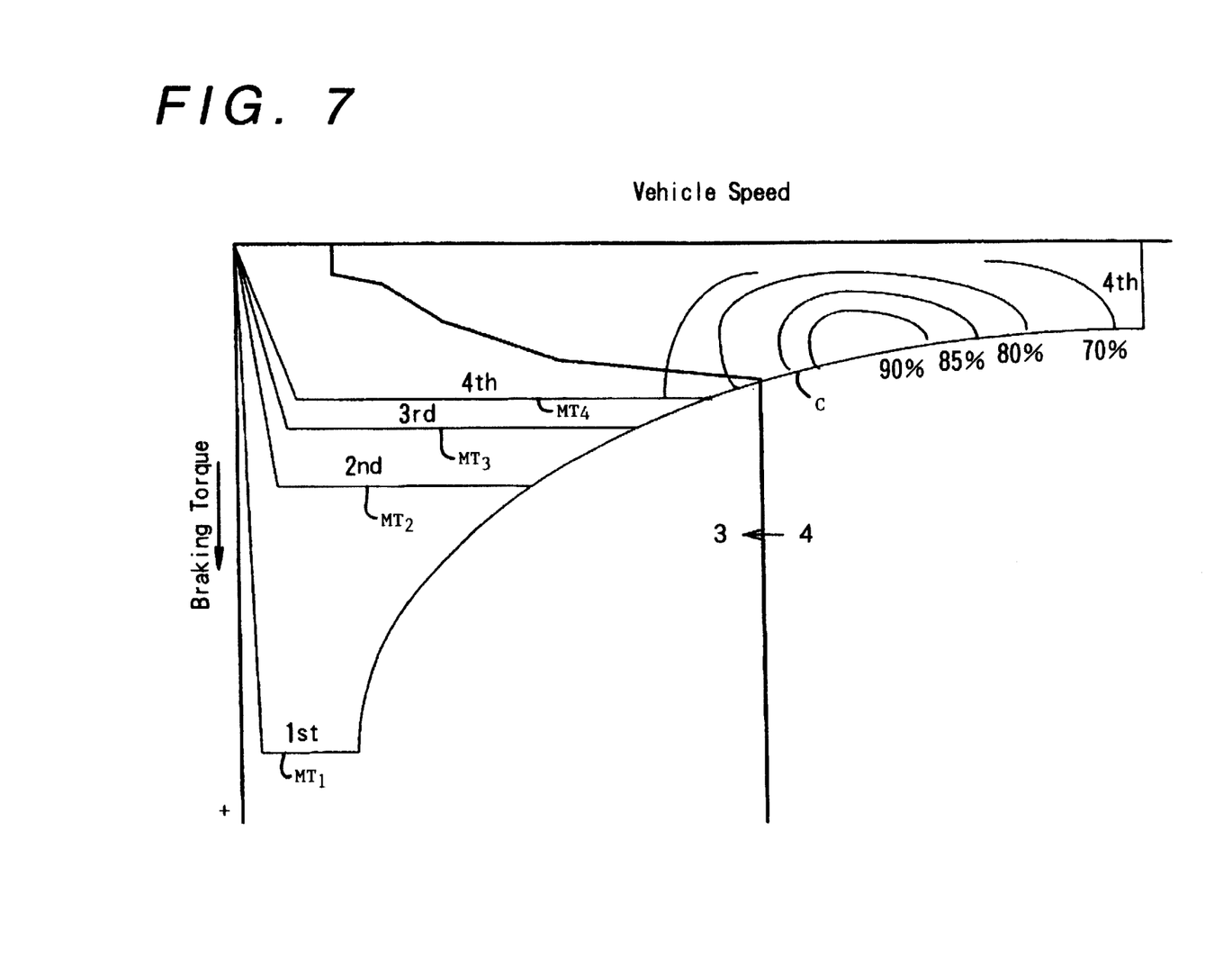
FIG. 7 is a diagram showing a shift map for changing the shift point on the maximum output line in accordance with the embodiment of the invention.

In the regenerative braking shift map of FIG. 9, the shift line, of the 4th speed→3rd speed of the gear stage, is set between the center of the efficiency curves of the motor (the curves for 70, 80, 85 and 90% at the 4th speed shown) and the intersection between the equal output curve C of the motor and the maximum torque line $MT_i$ (i=1 through 4), as shown in FIG. 7.

On the other hand, the region having a high braking torque is set with the shift line of the 4th speed→the 2nd speed by reducing the number of shift lines (see FIG. 9). Further, the shift lines of the shift map can be altered to set the jump shift of the 4th speed→the 1st speed.

Figure 8:
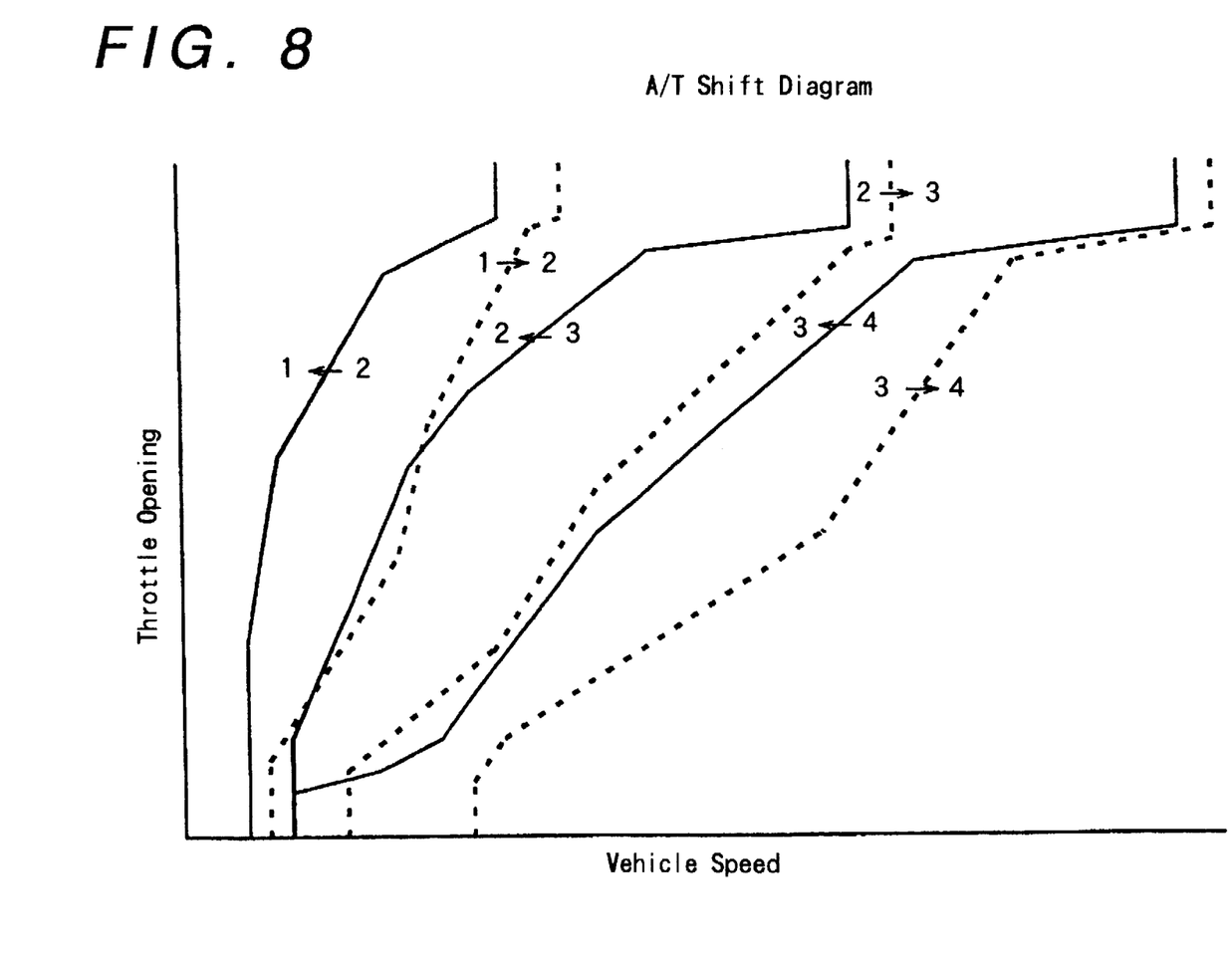
FIG. 8 is an A/T shift diagram or driving shift map.

Moreover, the shift line for the region having a low braking torque is made identical to the down-shift line of the A/T shift diagram, as shown in FIG. 8.

Figure 10:
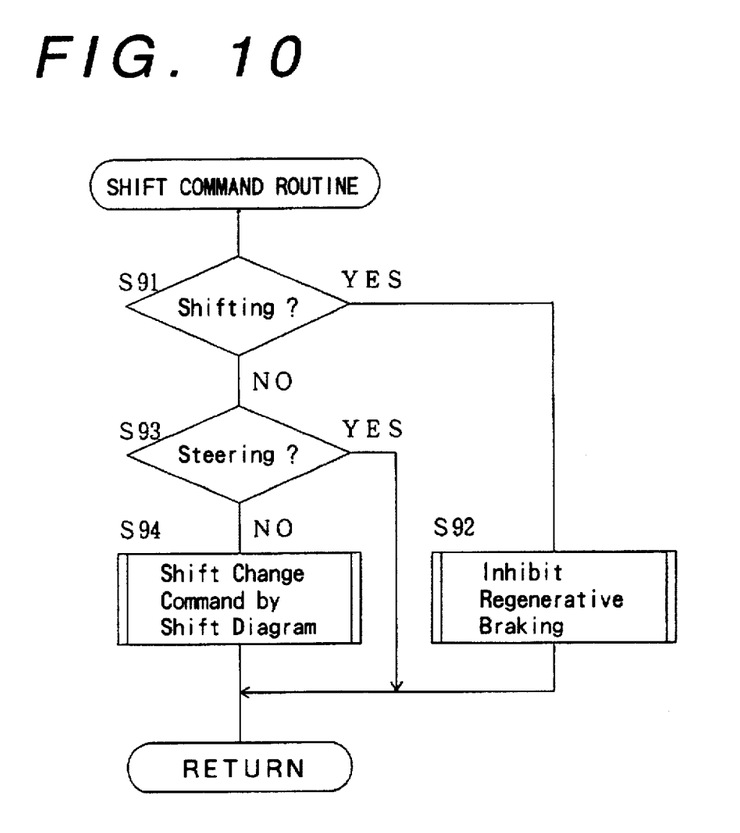
FIG. 10 is a shift command flow chart according to the embodiment of the invention.

Here will be described the shift command flow of this case with reference to FIG. 10.

First, it is checked at Step S91 whether the transmission is being shifted. If the result is YES, the regenerative braking is inhibited at Step S92 and the routine is returned to the main program. If the answer at Step S91 is NO, it is checked, at Step S93 whether the vehicle is being steered.

If the result is NO, the shift change command is executed at Step S94 according to the regenerative braking shift map shown in FIG. 9. Moreover, the routine is returned to the main program if the answer of Step S93 is YES.

As shown in FIG. 9, there are provided the vehicle speed sensor 11 for detecting the vehicle speed and the brake depression force sensor 10 for detecting the depression force of the brake. The shift control means is provided with the braking shift map for determining the shift points of the gear stages at the braking time of the vehicle in accordance with the vehicle speed by the output signal of the vehicle speed sensor 11 and the braking torque by the output signal of the brake depression force sensor 10; and the shift command means for shifting the transmission 3 on the basis of the braking shift map. Thus, the shift is effected from the relationship between the vehicle speed and the braking torque on the basis of the preset braking shift map so that the control is simplified. On the other hand, the braking shift map has less shift points for the gear stages in the range having a high braking torque.

There is further provided the driving shift map, or A/T shift diagram, which is set on the vehicle speed and the throttle opening, as shown in FIG. 8. The braking shift map is set such that the shift points in the range having a low braking torque are identical to the downshift points of the driving shift map.

Thus, in the range of high braking torque, that is, with a large depression of the brake, it is determined that the braking is abrupt. Hence, the busy shift can be avoided by reducing the shift points to effect the jump shift such as from the 4th to 1st speeds or from the 3rd to 1st speeds. In the range having a low braking torque, on the other hand, preparations are made for the reacceleration from the deceleration state so that the unnecessary shift at the changing time from the braking shift map to the driving shift can be prevented.

Incidentally, the invention should not be limited to the foregoing embodiment but can be modified in various ways on the basis of this disclosure, and such modifications are included within the scope of the invention.

What is claimed is:

1. A control system for a drive unit of a vehicle, comprising:

an engine having an output shaft;

a transmission connected to the output shaft of said engine and having a plurality of gear stages for transmitting the power to wheels of the vehicle;

a motor generator connected to the output shaft of said engine for recovering a braking energy of the wheels through said transmission by generating electricity;

a battery for storing the braking energy, which is recovered by said motor generator, as an electric power;

running status detecting means for detecting a running status of the vehicle; and control means for controlling said transmission and said motor generator in accordance with an output signal coming from said running status detecting means, wherein said control means includes:

motor generator control means for causing said motor generator to generate the electricity, when said running status detecting means detects a deceleration state of the vehicle, thereby to recover the braking energy; and shift control means for shifting said transmission to a gear stage in a range of gear stages from a present gear stage to a gear stage having a highest gear ratio, the gear stage shifted to having a gear ratio higher than that of the present gear stage to maximize recoverable braking energy.

2. The control system for a drive unit according to claim 1, wherein said shift control means includes:

braking energy computing means for computing braking energies to be recovered at individual gear stages;

gear stage selecting means for selecting a gear stage maximizing the recoverable braking energy from the present gear stage and the gear stage having a higher gear ratio than that of the former, by comparing the braking energies obtained from said braking energy computing means; and shift command means for shifting said transmission to the gear stage which is determined by said gear stage selecting means.

3. The control system for a drive unit according to claim 2, further comprising:

a brake depression force sensor for detecting a depression force of a brake; and a motor generator RPM sensor for detecting a RPM of said motor generator, wherein said computing means computes the braking energy from a product of a braking torque indicated by an output signal of said brake depression force sensor, the RPM of said motor generator indicated by an output signal of said motor generator RPM sensor, and an efficiency of said motor generator.

4. The control system for a vehicular drive unit according to claim 2, further comprising a vehicle speed sensor for detecting a vehicle speed, wherein when the vehicle speed indicated by an output signal of said vehicle speed sensor is below a predetermined value, said shift command means shifts the transmission to the gear stage which is determined by said gear stage selecting means.

5. The control system for a vehicular drive unit according to claim 1, further comprising:

a vehicle speed sensor for detecting a vehicle speed; and a brake depression force sensor for detecting a depression force of a brake, wherein said shift control means includes:

a braking shift map for determining shift points of the gear stages in accordance with the vehicle speed indicated by an output signal of said vehicle speed sensor and a braking torque indicated by an output signal of said brake depression force sensor; and shift command means for shifting said transmission on a basis of said braking shift map.

6. The control system for a vehicular drive unit according to claim 5, wherein the braking shift map is set to reduce shift points within a range in which the braking torque is high.

7. The control system for a vehicular drive unit according to claim 1, further comprising a brake depression force detecting sensor for detecting a depression force of a brake, wherein said shift control means shifts said transmission to the gear stage for maximizing the recoverable braking energy, in accordance with an output signal of said brake depression force sensor when the depression force of the brake is below a predetermined value or when the change in the brake depression force is below a predetermined value.

8. The control system for a vehicular drive unit according to claim 1, further comprising a steering angle sensor for detecting a steering angle, wherein said shift control means shifts said transmission to the gear stage for maximizing the recoverable braking energy when it is determined on the basis of an output signal of said steering angle sensor that the vehicle is not being steered.

9. The control system for a vehicular drive unit according to claim 1, wherein said motor generator control means causes, when said transmission is not being shifted, said motor generator to generate the electricity thereby to recover the braking energy from said wheels.

10. A control system for a drive unit of a vehicle, comprising:

an engine;

a transmission connected to an output shaft of said engine and having a plurality of gear stages for transmitting power to wheels of the vehicle;

a motor generator connected to the output shaft of said engine for recovering braking energy of said wheels through said transmission by generating electricity;

a battery for storing the braking energy, which is recovered by said motor generator, as an electric power;

running status detecting means for detecting a running status of the vehicle; and control means for controlling said transmission and said motor generator in accordance with an output signal coming from said running status detecting means, wherein said control means includes:

motor generator control means for causing said motor generator to generate the electricity, when said running status detecting means detects a deceleration state of the vehicle, thereby to recover the braking energy; and shift control means for shifting said transmission to such a gear stage, when it is detected by said running status detecting means that any deceleration of the vehicle is unnecessary, that a RPM of said motor generator is less than and closest to a predetermined value.

11. The control system for a vehicular drive unit according to claim 10, wherein said shift control means includes:

RPM computing means for computing the RPM of said motor generator at individual gear stages;

gear stage selecting means for selecting a gear stage, at which the RPM of said motor generator is less than and closest to said predetermined value, in accordance with a result of said RPM computing means; and shift command means for shifting said transmission to the gear stage which is selected by said gear stage selecting means.

12. The control system for a vehicular drive unit according to claim 11, wherein said gear stage selecting means selects a highest one of said gear stages when none of the RPMs of said motor generator, as computed by said computing means, is less than said predetermined value.

13. The control system for a vehicular drive unit according to claim 10, further comprising:

a vehicle speed sensor for detecting a vehicle speed; and a brake depression force sensor for detecting a depression force of a brake, wherein said shift control means includes:

a braking shift map for determining the shift points of the gear stages in accordance with the vehicle speed indicated by an output signal of said vehicle speed sensor and a braking torque indicated by an output signal of said brake depression force sensor; and shift command means for shifting said transmission on a basis of said braking shift map.

14. The control system for a vehicular drive unit according to claim 13, further comprising a throttle sensor for detecting a degree of opening of a throttle, wherein said shift control means includes a driving shift map for determining up-and down-shift points of said gear stages, when the vehicle is driven, in accordance with the vehicle speed indicated by an output signal of said vehicle speed sensor and the throttle opening indicated by an output signal of said throttle sensor, and said braking shift map is set such that a shift point within a range for a low braking torque is identical to that of a downshift of said driving shift map.

15. The control system for a vehicular drive unit according to claim 10, further comprising a brake depression force sensor for detecting a depression force of the brake, wherein said running status detecting means detects that deceleration of the vehicle is unnecessary, when it is decided as indicated by an output signal of said brake depression force sensor that a change in the brake depression force is negative.

* * * * *